(12) United States Patent     (10) Patent No.:   US 12,694,506 B2

Hwang et al.     (45) Date of Patent:    Jul. 28, 2026

---

(54) DEFECT DETECTING DEVICE AND METHOD

(71) Applicant: SAMSUNG ELECTRONICS CO., LTD., Suwon-si (KR)

(72) Inventors: Sungwook Hwang, Suwon-si (KR); Tae Soo Shin, Suwon-si (KR); Seulgi Ok, Suwon-si (KR); Kibum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 18/204,033

(22) Filed: May 31, 2023

(65) Prior Publication Data

US 2024/0127426 A1    Apr. 18, 2024

(30) Foreign Application Priority Data

Oct. 18, 2022    (KR) ........................ 10-2022-0134335

(51) Int. Cl.
| | |
|---|---|
| *G06T 7/00* | (2017.01) |
| *G06T 7/11* | (2017.01) |
| *G06T 7/60* | (2017.01) |
| *G06T 7/62* | (2017.01) |
| *G06V 10/141* | (2022.01) |
| *G06V 10/60* | (2022.01) |
| *H10P 74/20* | (2026.01) |

(52) U.S. Cl.
CPC ............... *G06T 7/001* (2013.01); *G06T 7/60* (2013.01); *G06V 10/141* (2022.01); *G06V*

*10/60* (2022.01); *G06T 2207/10061* (2013.01); *G06T 2207/30148* (2013.01)

(58) Field of Classification Search
CPC . G06T 7/001; G06T 7/60; G06T 2207/10061; G06T 2207/30148; G06T 7/11; G06T 7/62; G06V 10/141; G06V 10/60; G01N 21/956; G01N 21/8851; G01N 21/9501; G01N 23/2251; G01N 2021/8887; G01N 2223/07; G01N 2223/401; H01L 22/12
See application file for complete search history.

(56) References Cited

U.S. PATENT DOCUMENTS

| | | | | |
|---|---|---|---|---|
| 6,047,083 | A | * 4/2000 | Mizuno | .................... G06T 7/001 |
| | | | | 382/141 |
| 6,465,801 | B1 * | 10/2002 | Gann | .................... H04N 1/4097 |
| | | | | 250/559.4 |
| 7,747,062 | B2 | 6/2010 | Chen et al. | |
| 7,991,217 | B2 | 8/2011 | Nakagaki et al. | |

(Continued)

*Primary Examiner* — Gregory A Morse
*Assistant Examiner* — Ronde Lee Miller
(74) *Attorney, Agent, or Firm* — Sughrue Mion, PLLC

(57) ABSTRACT

A test device includes a memory and a controller. The memory stores reference data including a reference image obtained by photographing a reference pattern on a first semiconductor sample, a first height of the reference pattern, a first shadow length of the reference pattern, and a reference value that represents a correlation between the first height and the first shadow length. The controller receives an image obtained by photographing a pattern on a second semiconductor sample, measures a second shadow length of the pattern from the image, and calculates a second height of the pattern from the second shadow length based on the reference data.

20 Claims, 14 Drawing Sheets

(56) References Cited

U.S. PATENT DOCUMENTS

| | | | |
|---|---|---|---|
| 9,153,020 | B2 | 10/2015 | Takagi |
| 9,401,016 | B2 * | 7/2016 | Kulkarni ................. H01L 22/12 |
| 10,365,617 | B2 | 7/2019 | Lin et al. |
| 2002/0130262 | A1 * | 9/2002 | Nakasuji ............. G01N 23/225 |
| | | | 250/311 |
| 2013/0068947 | A1 * | 3/2013 | Nakamura ............. H01J 37/28 |
| | | | 250/311 |
| 2014/0204194 | A1 | 7/2014 | Otani et al. |
| 2018/0336671 | A1 * | 11/2018 | Schwarzband ........... G06T 7/60 |
| 2020/0209761 | A1 | 7/2020 | Liebregts et al. |
| 2021/0183614 | A1 * | 6/2021 | Sekiguchi ............. H01J 37/244 |
| 2022/0042936 | A1 * | 2/2022 | Okai ...................... G06N 3/045 |
| 2022/0189806 | A1 | 6/2022 | Agashe et al. |
| 2022/0199358 | A1 * | 6/2022 | Goosen ................... G06T 7/001 |
| 2023/0395272 | A1 * | 12/2023 | Fayard .................. G21C 3/048 |
| 2024/0127426 | A1 * | 4/2024 | Hwang ..................... G06T 7/60 |
| 2024/0242334 | A1 * | 7/2024 | Korb ....................... G06T 7/337 |
| 2025/0004386 | A1 * | 1/2025 | Ben-Harush ...... G03F 7/706837 |

* cited by examiner (b)

1

DEFECT DETECTING DEVICE AND METHOD

CROSS-REFERENCE TO RELATED APPLICATION

This application claims priority to Korean Patent Application No. 10-2022-0134335 filed in the Korean Intellectual Property Office on Oct. 18, 2022, the entire contents of which being herein incorporated by reference.

BACKGROUND

The present disclosure relates to a defect detecting device and method.

As integration of semiconductor devices increases, defects exert substantial influences on operations of elements. The defects directly relate to the yield of the semiconductor devices, so the importance of detecting and managing the defects is gradually increasing.

Recently, electron microscopes have been in wide use to investigate the defects of semiconductor wafers. Electron microscopes have exceedingly high resolution that is incomparable to optical microscopes so electron microscopes are appropriate in observing defects of the semiconductor wafers manufactured according to a fine process.

SUMMARY

It is an aspect to provide a defect detecting device for calculating a height of a pattern on a wafer and detecting defects.

According to an aspect of one or more embodiments, there is provided a test device comprising a memory that stores reference data including a reference image obtained by photographing a reference pattern on a first semiconductor sample, a first height of the reference pattern, a first shadow length of the reference pattern, and a reference value that represents a correlation between the first height and the first shadow length; and a controller that is configured to receive an image obtained by photographing a pattern on a second semiconductor sample, measure a second shadow length of the pattern from the image, and calculate a second height of the pattern from the second shadow length based on the reference data.

According to another aspect of one or more embodiments, there is provided a defect detecting system comprising a lamp including a plurality of light sources and irradiating light onto a semiconductor sample; a scanning electron microscope (SEM) device configured to generate an image, the image including a pattern formed on the semiconductor sample by the light and a second shadow of the pattern formed on the semiconductor sample by the light; and a test device configured to receive the image, measure a second shadow length of the second shadow in the image, and calculate a second height of the pattern formed on the semiconductor sample from the second shadow length, based on reference data that includes a first height of a reference pattern, a first shadow length according to the reference pattern, and a reference value that represents a correlation between the first height and the first shadow length.

According to yet another aspect of one or more embodiments, there is provided a method comprising generating an image of a semiconductor sample, the image including a pattern; measuring a first shadow length of the pattern in the image; calculating a height of the pattern based on reference data that includes a second height of a reference pattern corresponding to the first shadow length and the pattern included in the image, a second shadow length caused by the reference pattern, and a reference value that represents a correlation between the second height and the second shadow length; and determining that the pattern included in the image is a defect pattern when the height of the pattern included in the image is greater than a threshold value.

BRIEF DESCRIPTION OF THE DRAWINGS

The above and other aspect will be described with reference to the accompanying drawings, in which.

DETAILED DESCRIPTION

Figure 1:
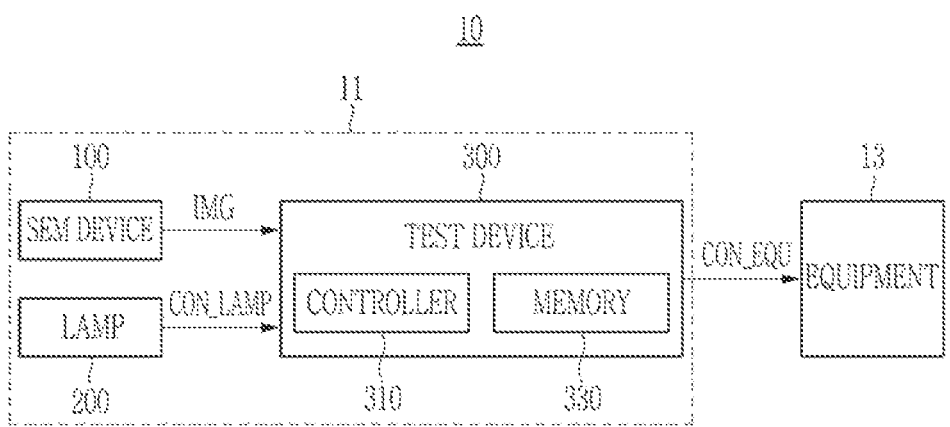
FIG. 1 shows a defect detecting system according to some embodiments.

In the following detailed description, only certain embodiments have been shown and described, simply by way of illustration. As those skilled in the art would realize, the described embodiments may be modified in various different ways, all without departing from the spirit or scope of the appended claims.

Accordingly, the drawings and description are to be regarded as illustrative in nature and not restrictive, and like reference numerals designate like elements throughout the specification.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others.

Figure 2:
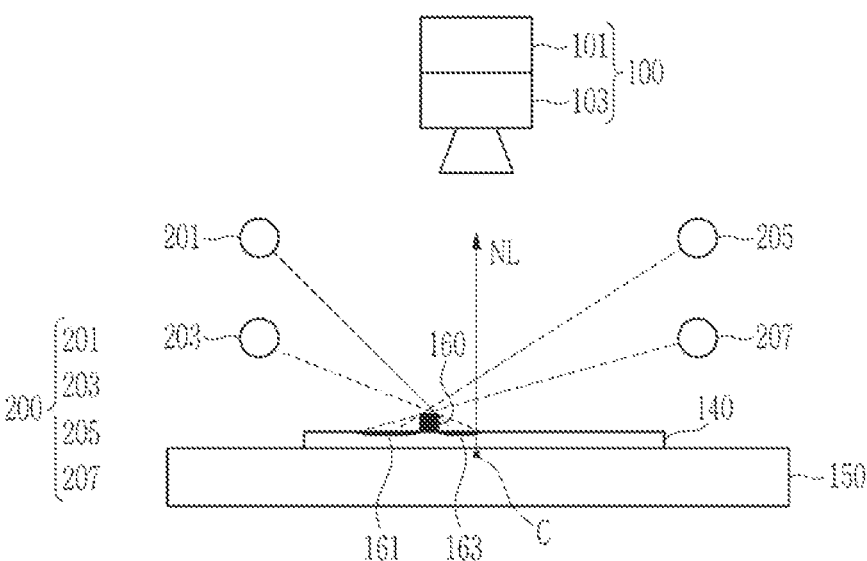
FIG. 2 shows a configuration of respective constituent elements of a defect detecting device of the defect detecting system of FIG. 1, according to some embodiments.

FIG. 1 shows a defect detecting system according to some embodiments. FIG. 2 shows a configuration of respective constituent elements of a defect detecting device of the defect detecting system of FIG. 1, according to some embodiments.

Referring to FIG. 1, the defect detecting system 10 may include a defect detecting device 11 and equipment 13.

The defect detecting device 11 may include a scanning electron microscope (SEM) device 100, a lamp 200, and a test device 300.

The SEM device 100 may observe a semiconductor sample and may generate an image IMG. In some embodiments, the semiconductor sample may be one of chips included in the semiconductor wafer, and in some embodiments, the semiconductor sample may be the semiconductor wafer. The semiconductor wafer may include a plurality of layers formed on a substrate. In some embodiments, the layers may include photoresist, a dielectric material, and a conductive material, but embodiments are not limited thereto.

In detail, as shown in FIG. 2, the SEM device 100 may include a camera 101 and a scanning electron microscope 103.

The camera 101 may use light reflected from a substrate 140 and may photograph a pattern 160 on the semiconductor sample. For example, the camera 101 may be a charge coupled device (CCD) camera or a complementary metal oxide semiconductor (CMOS) camera.

The scanning electron microscope 103 represents a device for irradiating electron beams to a surface of the semiconductor sample, using an interaction between the semiconductor sample and the electron beams, and observing the semiconductor sample. In some embodiments, the SEM device 100 may observe the semiconductor sample by using secondary electrons (SE), back scattered electrons (BSE), X-rays, and/or auger electrons.

The SEM device 100 may photograph the pattern 160 disposed on the semiconductor sample through the light reflected from the semiconductor sample, and may generate the image IMG including the pattern. In some embodiments, the images IMG generated by the SEM device 100 may include an SE image generated based on the secondary electrons, a BSE image generated based on the BSE, an auger image generated based on the auger electrons, and/or an X-ray image. In some embodiments, the X-ray image may include a Si X-ray image, an O X-ray image, a N X-ray image, and various other types of X-ray atom images generated based on the X-rays. However, embodiments are not limited thereto.

In some embodiments, the SEM device 100 may generate an image IMG including a shadow (i.e., a dark shadow) that has lower brightness when a size of the pattern increases according to a lens characteristic of the SEM device 100. The SEM device 100 may also generate an image IMG including a shadow (i.e., a bright shadow) that has higher brightness when the size of the pattern reduces. Therefore, when the shadow of the first pattern has a first length and first brightness, and the shadow of the second pattern has the first length and second brightness that is lower than the first brightness, the first pattern may be bigger than the second pattern. That is, from among the patterns having the same length of the shadow, the pattern with the greatest brightness value may be the biggest in size. The SEM device 100 may transmit the generated image IMG to the test device 300. The image IMG may be obtained by photographing the patterns positioned on the semiconductor sample and the shadows generated by the respective patterns. The shadow generated by the pattern positioned on the semiconductor sample in the image IMG generated by the SEM device 100 may have brightness that changes according to the height of the pattern.

The lamp 200 may irradiate light onto the semiconductor sample so that the SEM device 100 may photograph the semiconductor sample. The lamp 200 may be disposed above the substrate 140 so that the light may be irradiated onto the substrate 140 at an angle. The angle may be predetermined. Referring to FIG. 2, the lamp 200 may include a plurality of light sources, including in some embodiments a first light source 201, a second light source 203, a third light source 205, and a fourth light source 207. The first light source 201, the second light source 203, the third light source 205, and the fourth light source 207 may irradiate light onto the substrate 140 at different angles.

However, embodiments are not limited thereto, and the lamp 200 may include more than four light sources or may include less than four light sources.

Referring to FIG. 2, the plurality of light sources of the lamp 200 may be disposed to be symmetrical to each other with respect to a center C of the substrate 140. The substrate 140 may be put on a support 150. The center axis of the substrate 140 represents an imaginary line connecting the substrate 140 and the SEM device 100 in a normal line direction (NL) from the center C of the substrate 140. The SEM device 100 may be disposed in the center of the first light source 201, the second light source 203, the third light source 205, and the fourth light source 207, as illustrated by way of example in FIG. 2. That is, the SEM device 100 may be disposed at a position having a same distance from the first light source 201 and from the third light source 205. The SEM device 100 may be disposed at a position having a same distance from the second light source 203 and from the fourth light source 207. In this configuration, the first light source 201, the second light source 203, the third light source 205, and the fourth light source 207 may be positioned on one plane.

The lamp 200 may irradiate light to the substrate 140 so that the SEM device 100 may obtain height information of the pattern 160 positioned on the substrate 140. In some embodiments, the first light source 201 may irradiate light with a first angle with respect to the center axis of the substrate 140, and the second light source 203 may irradiate light with a second angle that is different from the first angle with respect to the center axis of the substrate 140. The third light source 205 may irradiate light with the first angle with respect to the center axis of the substrate 140, and the fourth light source 207 may irradiate light with the second angle that is different from the first angle with respect to the center axis of the substrate 140.

The shadow of the pattern 160 may be formed on the substrate 140 by the light output from the lamp 200. The shadow may be formed in many directions and may have many lengths according to the angle of light irradiated by the lamp 200 and the distance from the lamp. For example, the shadow 163 of the pattern 160 generated by the first light source 201 may be formed on a right side of the pattern 160. The shadow 161 of the pattern 160 generated by the fourth light source 207 may be formed on a left side of the pattern 160. Respective lengths of the shadows 161 and 163 may be different from each other, and the brightness value of the shadow 161 may be different from the brightness value of the shadow 163.

The lamp 200 may irradiate lattice-patterned light, laser light, and/or single-wavelength light. However, embodiments are not limited thereto. In some embodiments, the lamp 200 may irradiate the same type of light.

The test device 300 may analyze the image IMG received from the SEM device 100 and may provide an appropriate feedback to the equipment 13. In general, the semiconductor device may be manufactured according to a fabrication process for forming an electrical circuit including electrical parts on a silicon wafer used as the semiconductor wafer, an electrical die sorting (EDS) process for testing electrical characteristics of semiconductor devices made during the fabrication process, and a package assembling process for encapsulating the semiconductor devices with an epoxy resin and individualizing them. The fabrication process may include a deposition process for forming a film on a wafer, a chemical mechanical polishing process for planarizing the film, a photolithography process for forming a photoresist pattern on the film, an etching process for forming the film to be a pattern with an electrical characteristic by using the photoresist pattern, an ion injecting process for injecting specific ions into a predetermined region of the wafer, a cleaning process for removing impurities on the wafer, and a testing process for testing a surface of the wafer on which the film or the pattern is formed. In some embodiments, the test device 300 may analyze the image IMG received from the SEM device 100 when the respective processing stages end. For example, in some embodiments, the test device 300 may receive the image IMG from the SEM device 100 before the ion injection process after the etching process, and may analyze the received image IMG. In some embodiments, the test device 300 may analyze the image IMG received from the SEM device 100 in the testing process stage.

Returning to FIG. 1, the test device 300 may include a controller 310 and a memory 330. The controller 310 may control the SEM device 100 and the lamp 200. In some embodiments, the controller 310 may be a microprocessor, microcontroller, or hardware logic coded to perform the operations that follow. In detail, the controller 310 may transmit a lamp control signal CON_LAMP to the lamp 200. The lamp control signal CON_LAMP may include a signal for changing a position of the lamp 200, a signal for changing brightness of respective ones of the plurality of light sources of the lamp 200, and a signal for controlling on/off states of the lamp 200. For example, the controller 310 may control the first light source 201, the second light source 203, the third light source 205, and the fourth light source 207 individually so that the first light source 201, the second light source 203, the third light source 205, and the fourth light source 207 may irradiate light concurrently or at different times. In some embodiments, the controller 310 may transmit the lamp control signal CON_LAMP to the lamp 200 for controlling the first light source 201 and the third light source 205 to be simultaneously operated and the second light source 203 and fourth light source 207 to be simultaneously operated.

The controller 310 may measure a length of the shadow generated by the pattern of the semiconductor sample included in the image IMG received from the SEM device 100. The controller 310 may measure the brightness of the shadow generated by the pattern of the semiconductor sample included in the image received from the SEM device 100. The controller 310 may calculate a height of the pattern based on the length of the shadow generated by the pattern and the brightness of the shadow.

The controller 310 may analyze the image received from the SEM device 100 and may generate an equipment control signal CON_EQU for controlling the equipment 13. In some embodiments, the controller 310 may compare the length of the shadow and the brightness of the shadow of a normal pattern and the length of the shadow and the brightness of the shadow generated by the pattern, and may determine whether the pattern is a normal pattern. In some embodiments, the length of the shadow and the brightness of the shadow of the normal pattern may be stored in the memory 330. In some embodiments, the controller 310 may determine whether the pattern is a normal pattern based on the calculated height of the pattern. When the controller 310 determines that the pattern is not a normal pattern (i.e., the pattern is a defect pattern), the controller 310 may generate the equipment control signal CON_EQU for restoring the defect pattern to a normal pattern. For example, the controller 310 may generate the equipment control signal CON_EQU including information on the position of the pattern determined to be a defect and the height calculated from the shadow of the pattern. The equipment control signal CON_EQU may be transmitted to processing equipment for performing a unit process on the wafer according to a corrected recipe for restoring the defect pattern to a normal pattern. Upon receiving the equipment control signal CON_EQU, the process equipment may perform the unit process for restoring the defect pattern into a normal pattern by using information on the position and the height of the pattern determined to be the defect.

The memory 330 may store data used in determining whether the pattern measured by the controller 310 is a normal pattern.

For example, the memory 330 may store data on the position of the lamp 200, the position of the pattern of the semiconductor sample, the height of the pattern of the semiconductor sample, lengths of the shadows generated by the respective patterns of the semiconductor sample, and the brightness of the shadows generated by the respective patterns of the semiconductor sample.

The memory 330 may also store data for the controller 310 to generate an equipment control signal CON_EQU. For example, the memory 330 may store data on the equipment 13 for performing a corrected recipe for restoring a defect when the defect is positioned at a specific location in the semiconductor sample.

The equipment 13 may be equipment for manufacturing the semiconductor device. For example, the equipment 13 may be equipment for performing a depositing process, may be equipment for performing chemical mechanical polishing, may be equipment for performing a photolithography process, may be equipment for performing an etching process, may be equipment for performing an ion injection process, and may be equipment for performing a cleaning process. Each piece of equipment 13 may be operable based on the equipment control signal CON_EQU from the test device 300.

Figure 3:
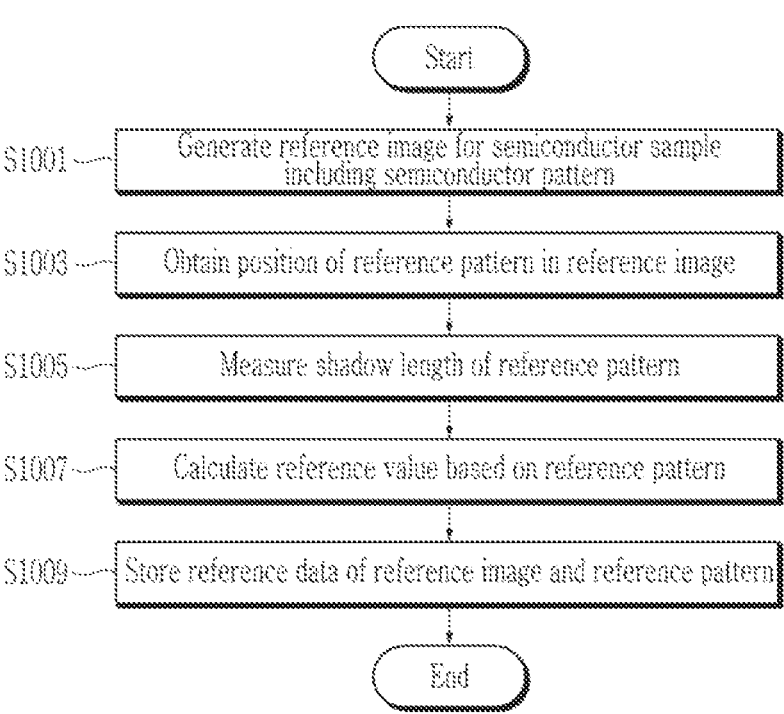
FIG. 3 shows a flowchart of a reference data generating method according to some embodiments.

FIG. 3 shows a flowchart of a reference data generating method according to some embodiments.

In detail, the defect detecting method according to FIG. 3 may be a method for the defect detecting device 11 to obtain reference data from a reference pattern.

The reference pattern may be a target of comparison for the controller 310 to determine whether there is a defect in the pattern detected in the image received from the SEM device 100. The reference pattern may be a normal pattern. The reference pattern may be formed on the first semiconductor sample. The controller 310 may store the image on the reference pattern formed on the semiconductor wafer to be tested and the reference data on the reference pattern in the memory 330. For example, the reference data may include data on the height of the reference pattern, the length of the shadow generated on the semiconductor sample by the reference pattern, the brightness value of the shadow, the reference value of the reference pattern, and the position on the semiconductor sample of the reference pattern. The height of the reference pattern may be a value that is determined at the time of processing. The reference pattern may be predetermined at the time of processing. Therefore, the controller 310 may obtain the height of the reference pattern without additional measuring. The reference value may represent a connection between the shadow and the height of the reference pattern, and for example, in some embodiments, the reference value may be a tangent value generated by dividing the height of the pattern by the shadow length or in some embodiments may be a theta ($\theta$) value formed by a straight line connecting the light source and the pattern and a surface of the semiconductor sample.

That is, the controller 310 may store the image of the normal pattern designed on a reticle in the memory 330 as a reference pattern, and may store the data of the reference pattern in the memory 330.

The SEM device 100 generates a reference image for the semiconductor sample including a semiconductor pattern (S1001).

The semiconductor pattern may be a normal pattern. The reference image may include a semiconductor pattern included in the semiconductor sample and a shadow caused by the semiconductor pattern.

The controller 310 obtains the position of the reference pattern in the reference image (S1003).

In some embodiments, the semiconductor sample may include a plurality of semiconductor patterns. The controller 310 may obtain the positions of the respective semiconductor patterns in the reference image. The positions of the semiconductor patterns may be positions of centers of the respective patterns.

The controller 310 measures the shadow length of the reference pattern (S1005).

In some embodiments, the controller 310 may measure the length of the shadow of the respective patterns in the reference image. In detail, the controller 310 may measure the length of the shadow on the semiconductor sample formed by a first pattern from among a plurality of patterns. The controller 310 may also measure the brightness value of the shadow according to the first pattern.

The controller 310 calculates the reference value based on the reference pattern (S1007).

In some embodiments, the controller 310 may include data on the heights of the respective normal semiconductor patterns stored in the memory 330. The controller 310 may calculate the reference value by using the length of the shadow of the measured first pattern and the height of the first pattern.

The controller 310 stores the reference data of the reference image and the reference pattern (S1009).

In detail, the controller 310 may store the reference image and the reference data (i.e., the shadow length of the first pattern, the brightness value of the first pattern, and the reference value of the first pattern) in the memory 330.

Figure 4:
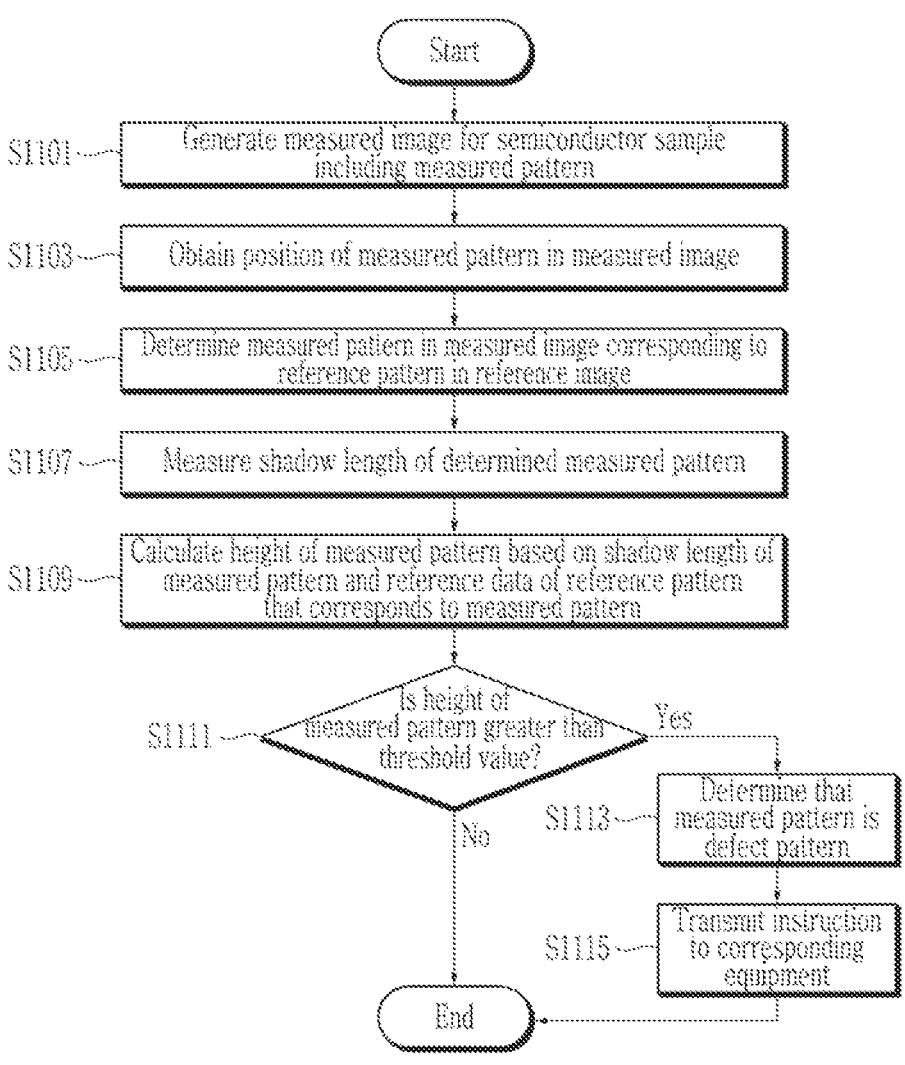
FIG. 4 shows a flowchart of a defect detecting method according to some embodiments.

FIG. 4 shows a flowchart of a defect detecting method according to some embodiments.

The SEM device 100 generates a measured image for a semiconductor sample including a measured pattern (S1101). As used herein, the term "measured pattern" is used to distinguish from the reference pattern discussed above.

In some embodiments, the measured pattern may be formed on a second semiconductor sample that is different from the first semiconductor sample on which the reference pattern is formed. In some embodiments, the first semiconductor sample and the second semiconductor sample may be different chips included in a same semiconductor wafer. In some embodiments, the first semiconductor sample and the second semiconductor sample may be different chips included in different semiconductor wafers. In some embodiments, the measured pattern may be a bad pattern. The bad pattern may be a normal pattern that has defects. The measured image may include a semiconductor pattern included in the semiconductor sample, a defect positioned on the semiconductor pattern, and/or a shadow caused by the semiconductor pattern and the defect.

The controller 310 obtains the position of the measured pattern in the measured image (S1103).

The controller 310 determines the measured pattern in the measured image corresponding to the reference pattern in the reference image (S1105).

For example, regarding the reference data generating method described with reference to FIG. 3, the controller 310 may detect reference data of a first pattern from among a plurality of patterns in the reference image, and may store the reference image and the reference data in the memory 330. The controller 310 may determine a second pattern having a position that corresponds to a position of the first pattern in the reference image from among a plurality of patterns in the measured image.

The controller 310 measures the shadow length of the determined measured pattern (S1107).

Since the defect is positioned on the second pattern, the length of the shadow on the semiconductor sample according to the second pattern may be different from the length of the shadow of the first pattern in the reference data. Further, the brightness value of the shadow according to the second pattern may be different from the brightness value of the shadow of the first pattern.

The controller 310 may calculate the height of the measured pattern based on the shadow length of the measured pattern and the reference data of the reference pattern that corresponds to the measured pattern (S1109).

The controller 310 is shown in FIG. 4 to measure the shadow length of the measured pattern (S1107) and calculate the height of the measured pattern (S1109). However, embodiments are not limited thereto. In some embodiments, the controller 310 may calculate the height value of the measured pattern when the shadow length of the measured pattern is greater than a shadow reference value for the shadow length of the reference pattern. The shadow reference value may be predetermined. For example, when the shadow length of the measured pattern is equal to or greater than 120% of the shadow length of the reference pattern, the controller 310 may determine that the shadow length of the measured pattern is greater than the shadow length of the reference pattern, and may calculate the height of the measured pattern.

A method for the controller 310 to calculate the height of the pattern in the measured image will now be described with reference to FIG. 5.

Figure 5A:
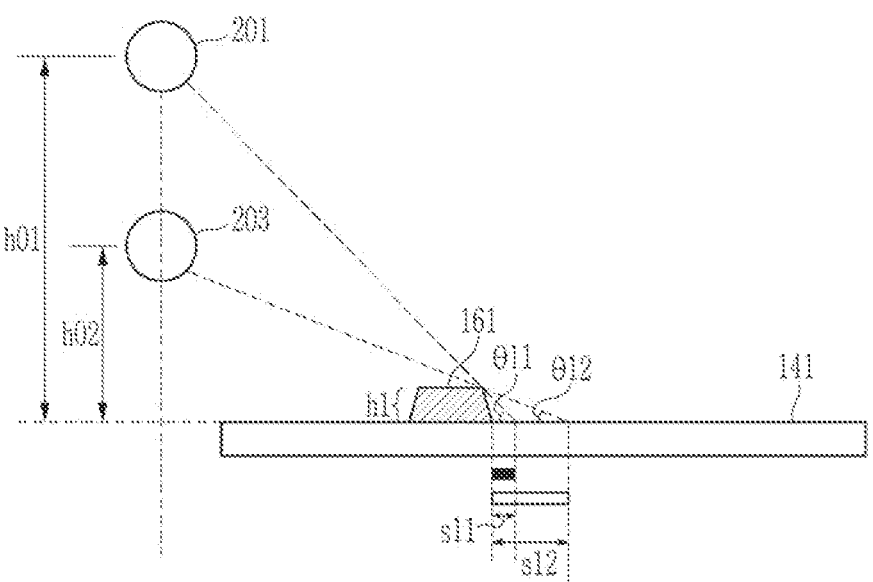
FIGS. 5A-5B show a configuration of respective constituent elements of a defect detecting device according to some embodiments.
Figure 5B:
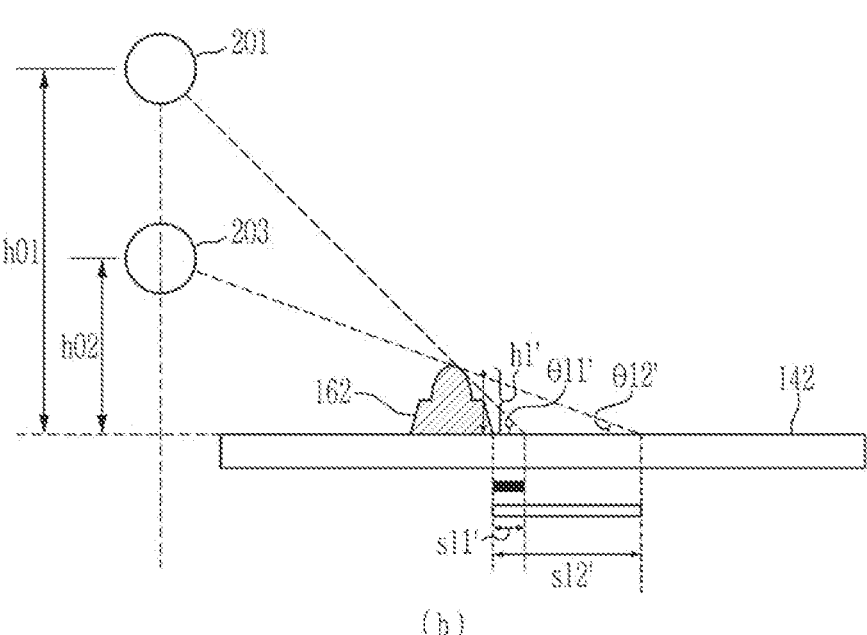

FIGS. 5A-5B show a configuration of respective constituent elements of a defect detecting device according to some embodiments.

In detail, FIG. 5A shows a lateral view when the reference pattern 161 is positioned on the semiconductor sample 141.

Referring to FIG. 5A, the first light source 201 and the second light source 203 may be positioned on a left of the semiconductor sample 141. As described with reference to FIG. 2, the defect detecting device may include a third light source 205 and a fourth light source 207. However, the third light source 205 and the fourth light source 207 are respectively disposed to be symmetric with the first light source 201 and the second light source 203 with respect to the semiconductor sample 141 so the method used for calculating the height of the defect pattern with respect to the third light source 205 and the fourth light source 207 may be similar to the method for calculating the height of the defect pattern using the first light source 201 and the second light source 203 and thus repeated description is omitted for conciseness. A method for calculating a height using the first light source 201 and the second light source 203 will be exemplified with reference to FIGS. 5A-5B.

The controller 310 may receive the reference image in which the reference pattern 161 is positioned on the semiconductor sample 141. The controller 310 may measure the reference data from the reference image.

As shown in FIG. 5A, the length of the shadow of the reference pattern 161 generated by the first light source 201 may be a first shadow length s11. The first shadow length s11 may represent a length to a position where the shadow ends from one end of the reference pattern 161.

The controller 310 may determine a first reference value based on the position of the pattern in the reference image, the first shadow length s11, a height h1 of the reference pattern, and a height h01 of the first light source 201. For example, in some embodiments, the reference value may be a first angle θ11 formed between a straight line connecting the first light source 201 and part of the reference pattern 161 and a surface of the semiconductor sample 141. In some embodiments, the reference value may be a tangent value of the first angle θ11. For example, the tangent value of the first angle θ11 may be the value obtained by dividing the height h1 of the pattern by the first shadow length s11.

The controller 310 may measure a first brightness value of a first shadow generated by the reference pattern 161 in the reference image.

The length of the shadow of the reference pattern 161 generated by the second light source 203 may be a second shadow length s12. The second shadow length s12 may represent the length to the position where the shadow ends from one end of the reference pattern 161.

In a like way, the controller 310 may determine a second reference value based on the position of the pattern in the reference image, the second shadow length s12, the height h1 of the reference pattern, and a height h02 of the second light source 203. For example, in some embodiments, the reference value may be a second angle θ12 between the straight line connecting the second light source 203 and part of the reference pattern 161 and the surface of the semiconductor sample 141. In some embodiments, the reference value may be the tangent value of the second angle θ12. For example, the tangent value of the second angle θ12 may be obtained by dividing the height h1 of the pattern by the second shadow length s12.

The controller 310 may measure a second brightness value of a second shadow generated by the reference pattern 161 of the reference image.

FIG. 5B shows a lateral view when a measured pattern 162 with a defect is positioned on a semiconductor sample 142.

The controller 310 may receive a measured image in which the measured pattern 162 is positioned on the semiconductor sample 142. The controller 310 may determine measured data from the measured image. The measured data may include data on the length of the shadow generated on the semiconductor sample 142 by the measured pattern 162, a brightness value of the measured pattern 162, and a position of the measured pattern 162 on the semiconductor sample 142.

As shown in FIG. 5B, the length of the shadow of the measured pattern 162 generated by the first light source 201 may be a first' shadow length s11'. The first' shadow length s11' may represent the length to a position where the shadow ends from one end of the measured pattern 162.

The controller 310 may obtain the position of the pattern in the measured image so the controller 310 may calculate a height h1' of the measured pattern 162, based on the first reference value with respect to the first light source 201 of the reference pattern 161 corresponding to the measured pattern 162, the height h1 of the reference pattern 161, and the first brightness value of the shadow of the reference pattern 161 (see FIG. 5A). In detail, the first' angle θ11' formed between the straight line connecting the first light source 201 and part of the reference pattern 161 and the surface of the semiconductor sample 141 may be equal to the first angle θ11 of the reference pattern 161 with respect to the first light source 201 (see FIG. 5A). Therefore, the controller 310 may calculate the height h1' of the measured pattern 162 from the first' shadow length s11'.

The length of the shadow of the measured pattern 162 generated by the second light source 203 may be a second' shadow length s12'. The second' shadow length s12' may represent a length to the position where the shadow ends from one end of the measured pattern 162.

In a like way, the controller 310 may calculate the height h1' of the measured pattern 162 based on the second reference value of the reference pattern 161 that corresponds to the measured pattern 162 with respect to the second light source 203, the height h1 of the reference pattern 161, and the second brightness value of the shadow of the reference pattern 161. In detail, the second' angle θ12' between the straight line connecting the second light source 203 and part of the reference pattern 161 and the surface of the semiconductor sample 141 may be equal to the second angle θ12 of the reference pattern 161 for the second light source 203. Therefore, the controller 310 may calculate the height h1' of the measured pattern 162 from the second' shadow length s12'.

The brightness value and the length of the shadow generated by one pattern may be changed by the light irradiated angle. The controller 310 may select the light source by which the length of the shadow may be well measured for respective patterns, and may calculate the height of the measured pattern through the shadow generated by the selected light source. In another way, the controller 310 may calculate the height of the measured pattern through a plurality of images in which the shadow is generated by the different light sources.

Referring again to FIG. 4, the controller 310 determines whether the height of the calculated measured pattern is greater than a threshold value (S1111). The threshold value may be predetermined.

In some embodiments, the threshold value may be a value relative to the height of the reference pattern. For example, when the height of the measured pattern is equal to or greater than 120% of the height of the reference pattern, the controller 310 may determine that the height of the measured pattern is greater than the threshold value.

When the height of the pattern in the measured image is greater than the threshold value (S1111, Yes), the controller 310 determines that the measured pattern is a defect pattern (S1113).

The controller 310 transmits an instruction to the equipment for removing the defect pattern or restoring the defect pattern into a normal pattern (S1115).

On the other hand, when the height of the pattern in the measured image is not greater than the threshold value (S1111, No), the controller 310 may determine that the measured pattern is a normal pattern and may finish the defect measuring method.

The controller 310 according to the operations of FIG. 4 has been described to determine that the measured pattern is a defect pattern when the height of the measured pattern is greater than a threshold value, but embodiments are not limited thereto. In some embodiments, the controller 310 may determine that the measured pattern is a defect pattern when the shadow length of the measured pattern is greater than a shadow reference value for the shadow length of the reference pattern.

Figure 6:
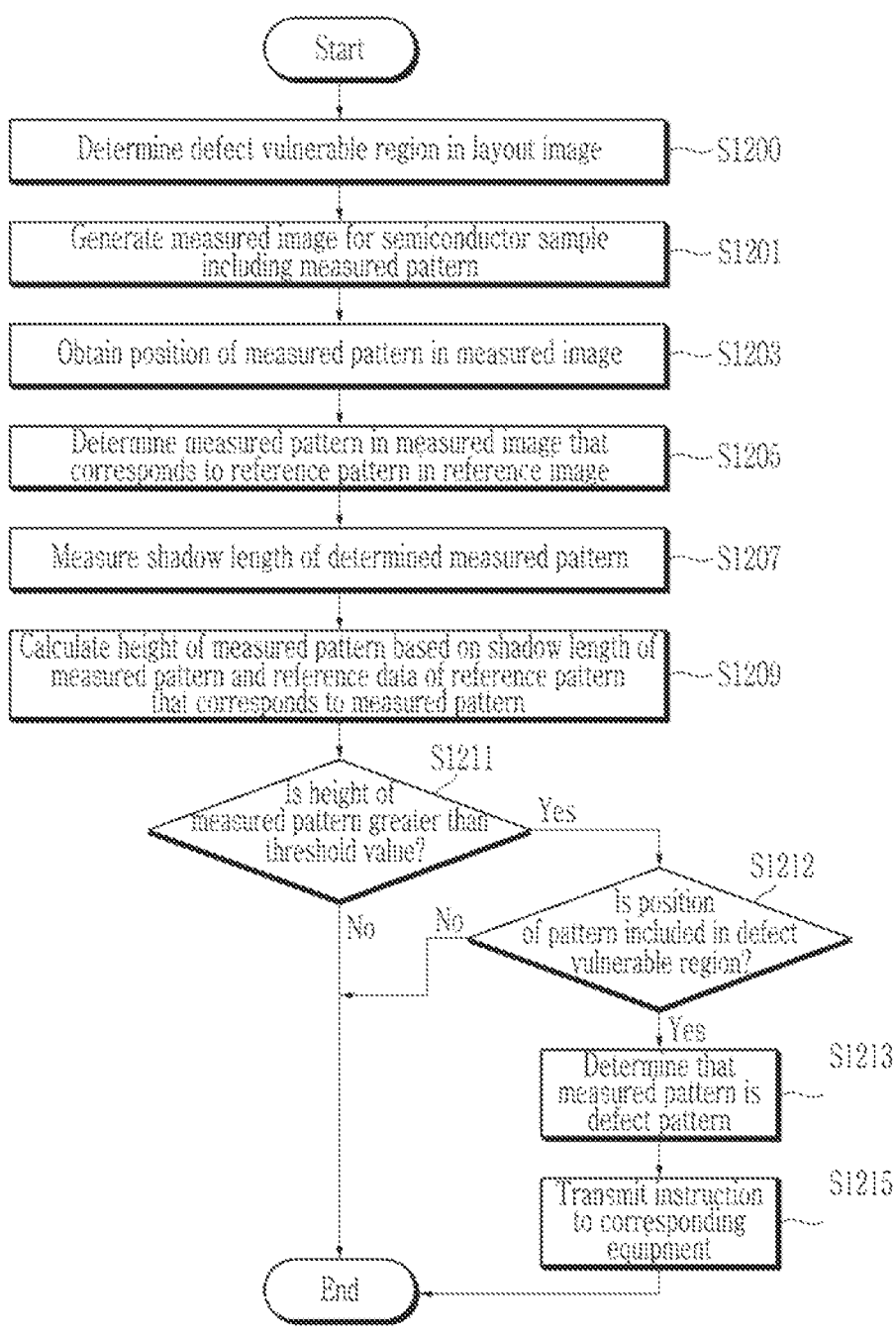
FIG. 6 shows a flowchart of a defect detecting method according to some embodiments.

FIG. 6 shows a flowchart of a defect detecting method according to some embodiments.

The controller 310 determines a defect vulnerable region in a layout image (S1200).

The defect vulnerable region may be a region in which a defect is more likely to occur than in another region. For example, the defect vulnerable region may include a region in which a first unit is combined to a second unit that is orthogonal to the first unit, and a region disposed between a first via and a second via electrically connected to the first via. In general, the defect vulnerable region may need a more precise patterning than other regions do.

In some embodiments, the controller 310 may determine a specific region selected from the layout by an input portion (not shown) to be a defect vulnerable region. In some embodiments, the controller 310 may determine a region that satisfies a design rule to be the defect vulnerable region. In some embodiments, the controller 310 may determine the defect vulnerable region by using a defect vulnerable region stored in the memory 330.

The example of the defect vulnerable region will now be described with reference to FIG. 7 to FIG. 13.

FIG. 7 to FIG. 13 show plan views and lateral views of defect vulnerable regions on a semiconductor device layout according to some embodiments.

Figure 7:
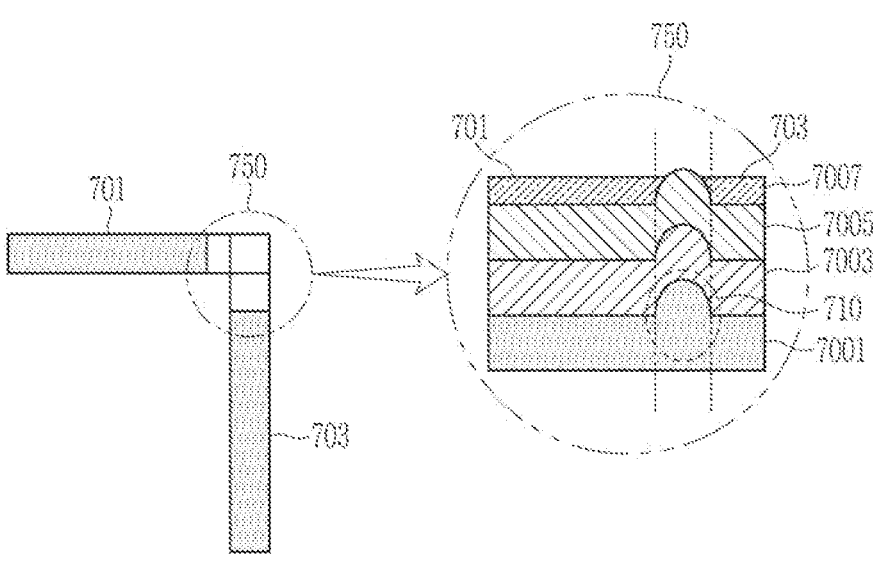
FIG. 7, FIG. 8, FIG. 9, FIG. 10, FIG. 11, FIG. 12, and FIG. 13 show plan views and lateral views of defect vulnerable regions on a semiconductor device layout according to some embodiments.

In FIG. 7, a left hand side shows a plan view and a right hand side shows a lateral view corresponding to the plan view. Referring to FIG. 7, the first element 701 and the second element 703 may cross each other. A crossing region 750 in which the first element 701 crosses the second element 703 may be the defect vulnerable region. In some embodiments, the first element 701 and the second element 703 may be constituent elements configuring a FinFET-structured transistor. For example, the first element 701 and the second element 703 may be gate electrodes with the FinFET-structured transistor.

Referring to the lateral view of the crossing region 750, when a defect 710 is generated on the first layer 7001, the defect 710 may influence the second layer 7003 and the third layer 7005 stacked on the first layer 7001. Hence, the first element 701 and the second element 703 may be separated from each other on the fourth layer 7007. Therefore, when the defect is generated in the crossing region 750 of the first element 701 and the second element 703, an electrical connection between the first element 701 and the second element 703 may be disconnected with a high probability.

Figure 8:
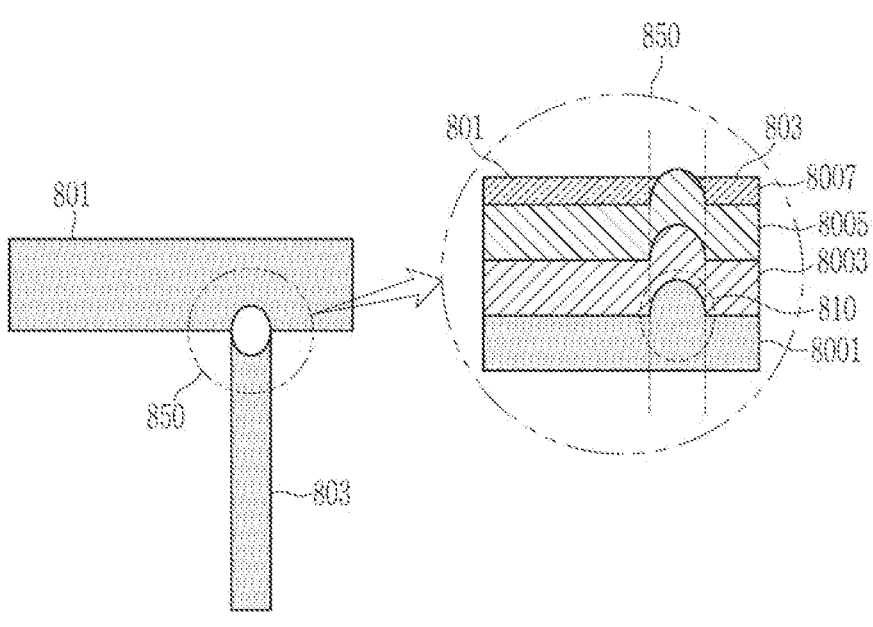

Referring to FIG. 8, the first element 801 may be connected to the second element 803 in a T type. The region in which the first element 801 is connected to the second element 803 may be the defect vulnerable region. In some embodiments, the first element 801 and the second element 803 may be constituent elements configuring the FinFET-structured transistor. For example, the first element 801 and the second element 803 may be the gate electrodes of the FinFET-structured transistor.

Referring to the lateral view of the crossing region 850, when a defect 810 is generated on the first layer 8001, the defect 810 may influence the second layer 8003 and the third layer 8005 that are stacked on the first layer 8001. Accordingly, the first element 801 and the second element 803 may be separated from each other on the fourth layer 8007. When the defect is generated to the crossing region 850 of the first element 801 and the second element 803, the electrical connection between the first element 801 and the second element 803 may be disconnected with a high probability.

Figure 9:
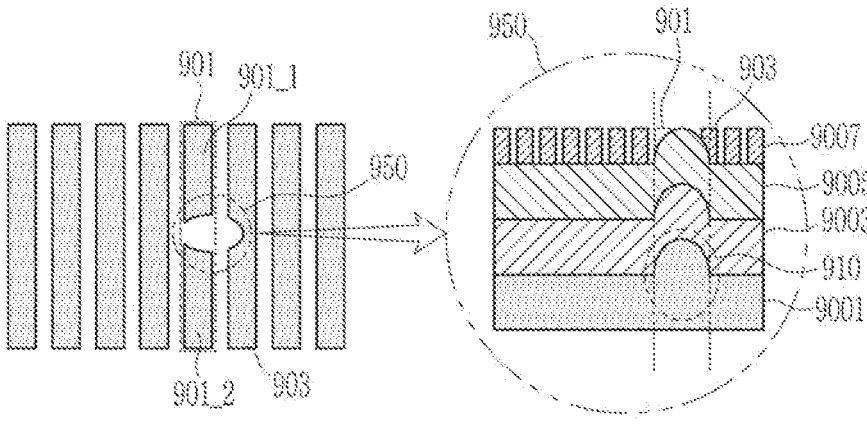

Referring to FIG. 9, the first element 901 and the second element 903 may be spaced from each other at a regular interval and may be positioned in parallel to each other. A region between the first element 901 and the second element 903 may be the defect vulnerable region. In some embodiments, the first element 901 and the second element 903 may be constituent elements for configuring the FinFET-structured transistor. For example, the first element 901 and the second element 903 may be gate electrodes of the FinFET-structured transistor. As the gap between the first element 901 and the second element 903 is reduced, the greater number of the gate lines may be influenced when the defect is generated.

Referring to a lateral view of a gap region 950, when the defect 910 is generated on the first layer 9001, the defect 910 may influence a second layer 9003 and a third layer 9005 stacked on the first layer 9001. Accordingly, it may be difficult for the gate line pattern to be formed on a portion where the defect 910 is positioned when the pattern of a fourth layer 9007 on which gate lines are arranged in parallel. Therefore, the first element 901 may not be formed by the defect 910 positioned in the gap region 950, and part of the second element 903 may be formed. That is, as shown in the plan view of FIG. 9, the first element 901 may be divided into a first portion 910_1 and a second portion 910_2 by the defect 910.

Figure 10:
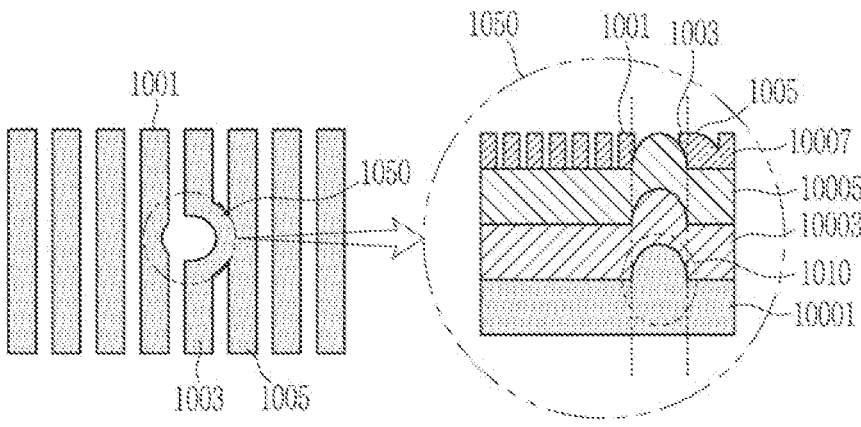

Referring to FIG. 10, the first element 1001, the second element 1003, and the third element 1005 may be spaced from each other at regular intervals to be thereby positioned in parallel to each other. A region among the first element 1001, the second element 1003, and the third element 1005 may be the defect vulnerable region. In some embodiments, the first element 1001, the second element 1003, and the third element 1005 may be constituent elements configuring the FinFET-structured transistor. For example, the first element 1001, the second element 1003, and the third element 1005 may be gate electrodes of the FinFET-structured transistor. As the gap among the first element 1001, the second element 1003, and the third element 1005 is reduced, the greater number of the gate lines may be influenced when the defect is generated.

Referring to the lateral view of the gap region 1050, when a defect 1010 is generated on the first layer 10001, the defect 1010 may influence the second layer 10003 and the third layer 10005 stacked on the first layer 10001. When the pattern of the fourth layer 10007 on which gate lines are arranged in parallel is formed, the gate line formed on the position where the defect 1010 is disposed may influence other gate lines by the influence of the defect 1010. Therefore, part of the first element 1001 may be formed by the defect 1010 positioned in the gap region 950, and the second element 1003 may be combined to the third element 1005. As shown in the plan view of FIG. 10, the second element 1003 may be deformed by the defect 1010 and may be combined to the third element 1005. Therefore, the second element 1003 and the third element 1005 may be connected to each other and may be electrically short-circuited.

Figure 11:
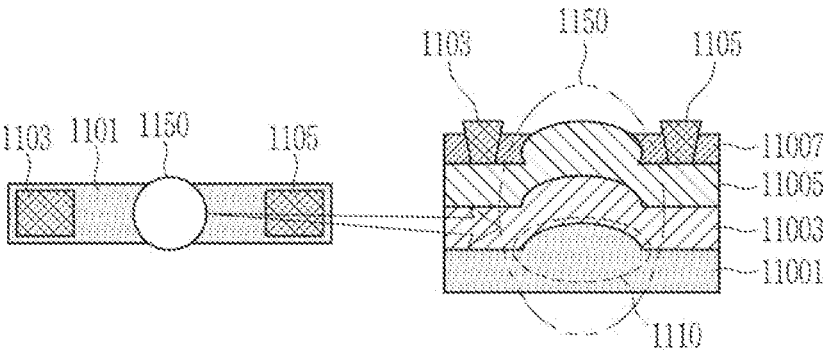

FIG. 11 may include a region between a first via 1104 on the first element 1101 and a second via 1105 electrically connected to the first via 1104. A region connecting the first via 1104 and the second via 1105 may be the defect vulnerable region.

Referring to the lateral view of a region 1150 between the first via 1104 and the second via 1105, when a defect 1110 is generated on a first layer 11001, the defect 1110 may influence a second layer 11003 and a third layer 11005 stacked on the first layer 11001. Hence, the connection between the first via 1103 and the second via 1105 may be disconnected on the fourth layer 11007.

Therefore, when a defect is generated in the region 1150 between the first via 1103 and the second via 1105, the electrical connection between the first via 1103 and the second via 1105 may be disconnected with a high probability.

Figure 12:
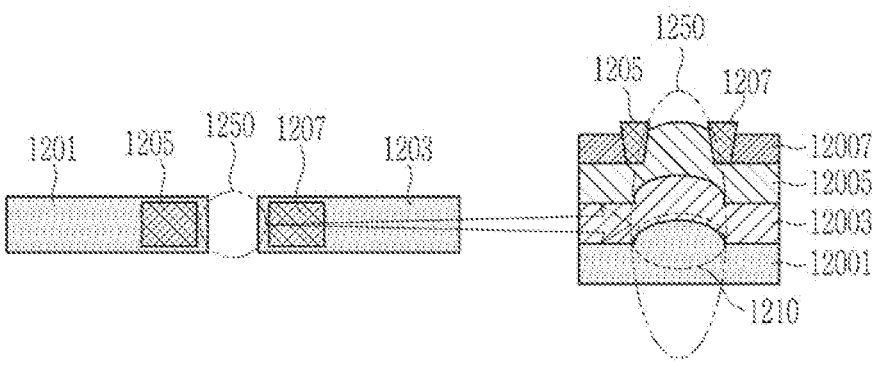

FIG. 12 may include a region between a first via 1205 on a first element 1201 and a second via 1207 on a second element 1203 electrically connected to the first element 1201. A region between the first via 1204 and the second via 1205 may be the defect vulnerable region.

Referring to the lateral view of a region 1250 among the via, when a defect 1210 is generated on the first layer 12001, the defect 1210 may influence a second layer 12003 and a third layer 12005 stacked on a first layer 12001. Thus, the connection between the first via 1203 and the second via 1205 may be disconnected on the fourth layer 12007.

Hence, when a defect is generated to the region 1250 between the first via 1203 and the second via 1205, the electrical connection between the first via 1203 and the second via 1205 may be disconnected with a high probability.

Figure 13:
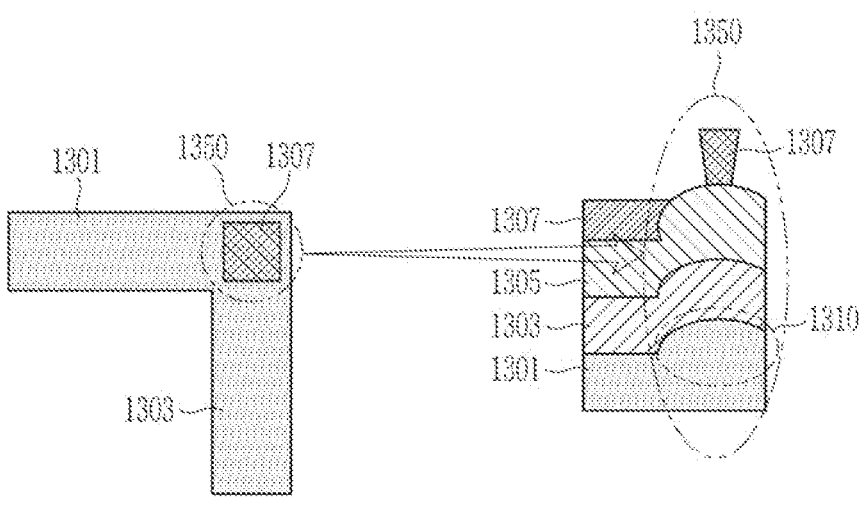

Referring to FIG. 13, the first element 1301 and the second element 1303 may cross each other. A crossing region 1350 in which the first element 1301 crosses the second element 1303 may be the defect vulnerable region.

Referring to a lateral view of the crossing region 1350, when a defect 1310 is generated on the first layer 13001, the defect 1310 may influence a second layer 13003 and a third layer 13005 stacked on a first layer 13001. Thus, a via 1307 that is to be formed on a fourth layer 13007 may be erroneously formed by the defect 1310. Therefore, the via 1307 may fail to be operable in a correct way.

In some embodiments, the first element 1301 may be separated from the second element 1303. Therefore, when a defect is generated to the crossing region 1350 of the first element 1301 and the second element 1303, the electrical connection of the first element 1301 and the second element 1303 may be disconnected with a high probability.

Referring again to FIG. 6, the SEM device 100 generates a measured image for the semiconductor sample including the measured pattern (S1201).

The controller 310 obtains the position of the measured pattern in the measured image (S1203).

The controller 310 determines the measured pattern in the measured image that corresponds to the reference pattern in the reference image (S1205).

The controller 310 measures the shadow length of the determined measured pattern (S1207).

The controller 310 may calculate the height of the measured pattern based on the shadow length of the measured pattern and the reference value of the reference pattern that corresponds to the measured pattern (S1209).

The controller 310 determines whether the height of the calculated measured pattern is greater than a threshold value (S1211). The threshold value may be predetermined.

When the height of the pattern in the measured image is greater than the threshold value (S1211, Yes), the controller 310 determines whether the position of the pattern is included in the defect vulnerable region (S1212).

When the position of the pattern is not included in the defect vulnerable region (S1212, No), the controller 310 may determine that the measured pattern is a normal pattern, and may finish the defect measuring method.

On the other hand, when the position of the pattern is included in the defect vulnerable region (S1212, Yes), the controller 310 determines that the measured pattern is a defect pattern (S1213).

The controller 310 transmits an instruction to the equipment for removing the defect pattern or restoring the defect pattern into a normal pattern (S1215).

When the height of the pattern in the measured image is not greater than the threshold value (S1211, No), the controller 310 may determine that the measured pattern is a normal pattern, and may finish the defect measuring method.

While various embodiments have been described in connection with the drawings, it is to be understood that embodiments are not limited to the disclosed embodiments, but, on the contrary, are intended to cover various modifications and equivalent arrangements included within the spirit and scope of the appended claims.

What is claimed is:

1. A test device comprising:
   a memory that stores reference data including a reference image obtained by photographing a reference pattern on a first semiconductor sample, a first height of the reference pattern, a first shadow length of the reference pattern, and a reference value that represents a correlation between the first height and the first shadow length that were previously measured from the reference pattern physically formed on the first semiconductor sample; and
   a controller that is configured to receive an image obtained by photographing a pattern on a second semiconductor sample, measure a second shadow length of the pattern from the image, and calculate a second height of the pattern from the second shadow length by applying the reference value to the second shadow length.

2. The test device of claim 1, wherein:
   the memory further stores a defect vulnerable region of a semiconductor device layout, the defect vulnerable region being a region in which a defect is more likely to occur than other regions of the semiconductor device layout, and
   the controller is configured to determine the pattern to be a defect pattern when the second height is greater than a threshold value and the pattern on the second semiconductor sample is disposed in the defect vulnerable region.

3. The test device of claim 2, wherein the defect vulnerable region includes a region in which a first gate electrode crosses a second gate electrode.

4. The test device of claim 2, wherein the defect vulnerable region includes a region between a first gate electrode and a second gate electrode that is disposed near the first gate electrode and that is disposed in parallel to the first gate electrode.

5. The test device of claim 2, wherein the defect vulnerable region includes a region between a first via and a second via that is electrically connected to the first via.

6. The test device of claim 1, wherein the reference data further includes a first brightness value of the reference pattern, and the controller is configured to calculate the second height of the pattern on the second semiconductor sample based on the first brightness value.

7. The test device of claim 1, wherein the reference value is a tangent value obtained by dividing the first height by the first shadow length.

8. The test device of claim 1, wherein when the second height is greater than a threshold value, the pattern on the second semiconductor sample is a defect pattern.

9. A defect detecting system comprising:

a lamp including a plurality of light sources and irradiating light onto a semiconductor sample;

a scanning electron microscope (SEM) device configured to generate an image, the image including a pattern formed on the semiconductor sample by the light and a second shadow of the pattern formed on the semiconductor sample by the light; and a test device including a controller configured to receive the image, measure a second shadow length of the second shadow in the image, and calculate a second height of the pattern formed on the semiconductor sample by applying a reference value to the second shadow length, based on reference data that includes a first height of a reference pattern, a first shadow length of the reference pattern, and the reference value that represents a correlation between the first height and the first shadow length that were previously measured from the reference pattern physically formed on the semiconductor sample.

10. The defect detecting system of claim 9, wherein the reference value represents an angle between a surface of the semiconductor sample and a straight line that connects a first light source from among the plurality of light sources and the reference pattern.

11. The defect detecting system of claim 9, wherein the reference value is a tangent value obtained by dividing the first height by the first shadow length.

12. The defect detecting system of claim 9, wherein the test device is configured to determine that the pattern formed on the semiconductor sample is a defect pattern when the second height is greater than a threshold value.

13. The defect detecting system of claim 9, wherein the test device is configured to determine that the pattern formed on the semiconductor sample is a defect pattern when the second height is greater than a threshold value and the pattern formed on the semiconductor sample is disposed in a defect vulnerable region of a semiconductor device layout, the defect vulnerable region being a region in which a defect is more likely to occur than other regions of the semiconductor device layout.

14. A method comprising:

generating an image of a semiconductor sample, the image including a pattern;

measuring a first shadow length of the pattern in the image;

calculating a height of the pattern by applying a reference value to the first shadow length based on reference data that includes a second height of a reference pattern corresponding to the first shadow length and the pattern included in the image, a second shadow length ofcaused by the reference pattern, and the reference value that represents a correlation between the second height and the second shadow length that were previously measured from the reference pattern physically formed on the semiconductor sample; and determining that the pattern included in the image is a defect pattern when the height of the pattern included in the image is greater than a threshold value.

15. The method of claim 14, further comprising determining a defect vulnerable region in a layout image, the defect vulnerable region being a region in which a defect is more likely to occur than other regions of the layout image, wherein the pattern included in the image is determined as the defect pattern when the pattern included in the image is included in the defect vulnerable region.

16. The method of claim 15, wherein determining the defect vulnerable region includes determining a region in which a first gate electrode crosses a second gate electrode to be the defect vulnerable region.

17. The method of claim 15, wherein determining the defect vulnerable region includes determining a region between a first gate electrode and a second gate electrode that is disposed near the first gate electrode and that is disposed in parallel to the first gate electrode to be the defect vulnerable region.

18. The method of claim 15, wherein determining the defect vulnerable region includes determining a region between a first via and a second via that is electrically connected to the first via to be the defect vulnerable region.

19. The method of claim 14, wherein the reference data further include a first brightness value on the reference pattern.

20. The method of claim 14, further comprising transmitting an equipment control signal for restoring the defect pattern into a normal pattern to processing equipment for performing a unit process on the semiconductor sample.

* * * * *